United States Patent
Singh et al.

(10) Patent No.: US 8,289,874 B1
(45) Date of Patent: **\*Oct. 16, 2012**

(54) USING MOBILE-STATION REVISION RATIO TO IMPROVE REVERSE-LINK PERFORMANCE

(75) Inventors: Jasinder P. Singh, Olathe, KS (US);
Maulik K. Shah, Overland Park, KS (US); Jason P. Sigg, Overland Park, KS (US); Ashish Bhan, Shawnee, KS (US); Anil Singh, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/620,364

(22) Filed: Nov. 17, 2009

(51) Int. Cl.
*G01R 31/08* (2006.01)

(52) U.S. Cl. ........ 370/252; 370/229; 370/328; 370/342; 455/513; 455/67.13; 455/67.11; 455/464; 455/68

(58) Field of Classification Search ............... None
See application file for complete search history.

(56) References Cited

U.S. PATENT DOCUMENTS

| | | |
|---|---|---|
| 6,970,437 B2 | 11/2005 | Lott et al. |
| 7,058,124 B2 | 6/2006 | Koo |
| 7,069,037 B2 | 6/2006 | Lott et al. |
| 7,647,065 B2 | 1/2010 | Au et al. |
| 7,831,257 B2 | 11/2010 | Pollman et al. |
| 7,936,698 B1 | 5/2011 | Sarkar et al. |
| 7,991,422 B2 | 8/2011 | Oroskar et al. |
| 2003/0218997 A1 | 11/2003 | Lohtia et al. |
| 2004/0121808 A1 | 6/2004 | Hen et al. |
| 2004/0179494 A1 | 9/2004 | Attar et al. |
| 2004/0179525 A1 | 9/2004 | Balasubramanian et al. |
| 2004/0214591 A1 | 10/2004 | Lott et al. |
| 2005/0047365 A1 | 3/2005 | Hong et al. |
| 2006/0203724 A1 | 9/2006 | Ghosh et al. |
| 2006/0223444 A1 | 10/2006 | Gross et al. |
| 2006/0291383 A1 | 12/2006 | Bi et al. |
| 2007/0168482 A1 | 7/2007 | Chen et al. |
| 2007/0192090 A1 | 8/2007 | Shahidi |
| 2007/0286128 A1 | 12/2007 | Bae et al. |
| 2008/0004031 A1 | 1/2008 | Rong et al. |
| 2008/0049706 A1 | 2/2008 | Khandekar et al. |
| 2008/0062925 A1 | 3/2008 | Mate et al. |
| 2008/0137614 A1 | 6/2008 | Kwon et al. |
| 2008/0212460 A1 | 9/2008 | Sampath |

(Continued)

OTHER PUBLICATIONS

Non-Final Office Action mailed Aug. 3, 2011 for U.S. Appl. No. 12/356,590.

(Continued)

*Primary Examiner* — Kibrom T Hailu

(57) ABSTRACT

Methods and systems are provided for using mobile-station revision ratio to improve reverse-link performance. An access node provides service to first and second subsets of access terminals, the first operating according to IS-856, Rel. 0, the second according to IS-856, Rev. A. The access node periodically transmits a reverse activity bit (RAB) to the access terminals, and also periodically computes a ratio of (a) either (1) the number of access terminals in the first subset or (2) the number of access terminals in the second subset to (b) a total number of access terminals in the first and second subsets, and transmits the ratio to at least the first subset. When the RAB is set, the access terminals in the first subset perform a ratio test by comparing the ratio with a threshold, and decrease their reverse-link data rates without reference to any reverse-link transitional probabilities when the computed ratio passes the ratio test.

25 Claims, 3 Drawing Sheets

U.S. PATENT DOCUMENTS

| | | |
|---|---|---|
| 2009/0054072 A1 | 2/2009 | Chen et al. |
| 2009/0103507 A1 | 4/2009 | Gu et al. |
| 2009/0170547 A1 | 7/2009 | Raghothaman et al. |
| 2010/0002673 A1 | 1/2010 | Bae et al. |
| 2010/0014487 A1 | 1/2010 | Attar et al. |
| 2010/0103877 A1 | 4/2010 | Wang et al. |
| 2010/0135213 A1 | 6/2010 | Au et al. |
| 2010/0167777 A1 | 7/2010 | Raghothaman et al. |
| 2010/0279653 A1 | 11/2010 | Poltorak |

OTHER PUBLICATIONS

Non-Final Office Action mailed Aug. 17, 2011 for U.S. Appl. No. 12/404,846.

Non-Final Office Action mailed Mar. 2, 2012 for U.S. Appl. No. 12/356,590.

Notice of Allowance mailed Feb. 14, 2012 for U.S. Appl. No. 12/620,344.

Notice of Allowance mailed Jan. 14, 2012 for U.S. Appl. No. 12/578,347.

Unpublished U.S. Appl. No. 12/356,590, entitled "Method and System for Providing Multiple Reverse Activity Bits" filed Jan. 21, 2009 in the name of Hemanth Balaji Pawar.

Unpublished U.S. Appl. No. 12/578,347, entitled "Methods and Systems for EV-DO Femtocells to Use Proximity to Prioritize Service to Access Terminals" filed Oct. 13, 2009 in the name of Shilpa Kowdley Srinivas.

Unpublished U.S. Appl. No. 12/620,344, entitled "Improving Reverse-Link Performance by Using Differentiated Reverse Activity Bits (RABs) Based on Mobile-Station Revision" filed Nov. 17, 2009 in the name of Jasinder P. Singh.

Unpublished U.S. Appl. No. 12/404,846, entitled "Method and System for Quality-of-Service-Differentiated Reverse Activity Bit" filed Mar. 16, 2009 in the name of Hemanth Balaji Pawar.

USING MOBILE-STATION REVISION RATIO TO IMPROVE REVERSE-LINK PERFORMANCE

BACKGROUND

1. Cellular Wireless Networks and EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Recently, service providers have introduced mobile stations and wireless networks that communicate using a CDMA protocol known as EV-DO, which stands for "Evolution Data Optimized." EV-DO networks, operating in conformance with one or more releases and/or revisions of industry specification IS-856, such as Release 0 and Revision A, both of which are hereby incorporated herein by reference, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some "hybrid" mobile stations can communicate with both 1× networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a BSC in 1× networks. The access node also includes one or more BTSs, each including one or more antennas that radiate to define wireless coverage areas such as cells and sectors. Note that sectors are used in the balance of this written description as an example of a wireless coverage area, though this is for explanation and not to the exclusion of cells or other coverage areas. Among other functions, the RNC controls one or more BTSs, and acts as a conduit between the BTSs and a PDSN, which provides access to a packet-data network. Thus, when positioned in a sector provided by an access node, an access terminal may communicate over the packet-data network via the access node and the PDSN.

2. Reverse Noise Rise

In general, in a given sector, an access node can provide service to access terminals on one carrier frequency (i.e. carrier), or on more than one. Furthermore, interference can be, and often is, present on a carrier in a sector. As used herein, an instance of a given carrier in a given sector may be referred to as a sector-carrier. In general, on a sector-carrier, an access node receives transmissions from access terminals operating on that sector-carrier. However, the access node often also receives transmissions on that sector-carrier from other access terminals, other devices, and/or any other sources of interference on that frequency.

At a given moment, the sum total of what an access node is receiving on a given sector— carrier is known as the reverse noise on that sector-carrier. At regular intervals, and in fact quite frequently (e.g., once for every forward-link timeslot (i.e. once every approximately 1.67 ms)), access nodes compute reverse noise rise (RNR), which is the difference between (i) the reverse noise that the access node is currently detecting and (ii) a baseline level of reverse noise. Thus, the access node computes how far the reverse noise has risen above that baseline.

To determine the baseline, EV-DO networks typically periodically utilize what is known as a silent interval, which may occur on the order of once every five minutes, and last on the order of 40-100 ms, both of which are typically configurable. During the silent interval, access terminals know not to transmit anything to the access node. The access node can then measure whatever else is out there. As such, the baseline corresponds to the amount of reverse noise when the sector-carrier is unloaded (i.e. without any transmitting access terminals). And other reverse-link-noise levels, such as 24-hour or other minimums, could be used as a baseline.

In general, the lower the RNR is at a given moment, the more favorable the RF conditions are for communication between access terminals and an access node at that moment. Correspondingly, the higher the RNR, the less favorable the RF conditions are. Moreover, a low RNR generally corresponds to a sector-carrier being lightly loaded, in other words that is supporting communications for a relatively low number of access terminals. A high RNR, as one might expect, generally corresponds to a sector-carrier being heavily loaded, in other words that is supporting communications for a relatively high number of access terminals.

3. Reverse Activity Bit (RAB)

Access nodes typically use the calculated value of RNR to, among other things, set or clear what is known as the Reverse Activity Bit (RAB), which is a value that the access node makes equal to 0 or 1, and repeatedly transmits to all the access terminals operating on a given sector-carrier. Note that making the RAB equal to 0 is known as "clearing" the RAB, while making the RAB equal to 1 is known as "setting" the RAB. As stated, the access node typically calculates RNR at the same frequency at which it transmits forward-link timeslots, or once every 1.67 ms. The access node typically sets or clears the RAB at this same frequency.

With respect to how the access node chooses whether to set or clear the RAB, if the RNR is above a threshold ("RNR threshold" or "RAB threshold"), which is a configurable parameter that may be between 0 dB and 30 dB, the access node sets the RAB. If the RNR is below the RNR threshold, the access node clears the RAB. The access node transmits the RAB in a TDM channel—known as the reverse-activity channel—on the forward link. That channel is itself a TDM portion of a forward-link channel known as the Media Access Control (MAC) channel. Note that the RAB is the same for all access terminals on a sector-carrier. The manner in which those access terminals use the value of the RAB is explained below.

4. Access Terminals Using the RAB Under IS-856, Rel. 0

The initial release of IS-856 is referred to as Release 0 (Rel. 0), while a subsequent revision is referred to as Revision A (Rev. A). This subsection relates to how EV-DO access terminals use the RAB in networks that operate according to Rel. 0, while the next subsection relates to how EV-DO access terminals use the RAB in networks that operate according to Rev. A. Note that some EV-DO networks may provide both Rel. 0 and Rev. A service; that is, a given EV-DO network may provide service to access terminals that operate according to Rel. 0, and also to access terminals that operate according to Rev. A.

Under Rel. 0, access terminals can transmit data to access nodes on the reverse link at five different data rates: 9.6 kilobits per second (kbps), 19.2 kbps, 38.4 kbps, 76.8 kbps, and 153.6 kbps. Transmission at these various data rates involves using different types of coding for the data to be transmitted, among other differences. Note that, during a given instance of an access terminal transmitting data to an access node, the access terminal typically starts out using the lowest of those data rates, 9.6 kbps.

Recall that the EV-DO reverse link is essentially a CDMA channel over which the access terminal transmits data to the access node. And the access terminal does so in units of time known as frames, each of which last approximately 26.67 ms, which is the length of time of 16 timeslots on the forward link. And the network is synchronized on CDMA time, such that sets of 16 timeslots on the forward link will be aligned along reverse-link-frame time boundaries.

So, the EV-DO access terminal will transmit its first frame to the access node at 9.6 kbps. And then, for the next frame, the access terminal will stay at that rate, or perhaps transition up to 19.2 kbps. From there, frame by frame for all subsequent frames, the access terminal will transmit at the rate that it is currently using, transition up to the next-higher rate, or transition down to the next-lower rate. Note that rate-setting frequencies other than every frame, such as every other frame or perhaps every four frames, could be used as well.

These (in this example) frame-by-frame decisions to maintain or change the reverse-link data rate are controlled by the RAB and by a table of reverse-link transitional probabilities that are stored by each access terminal. This table is typically sent from the access node to the access terminal during the session-setup process, though it can also be sent (or updated) as new air-interface connections are made between the access node and the access terminal, or perhaps periodically, or perhaps in response to some other event.

The table typically contains eight probabilities, each expressed as an integer between 0 and 255, as explained more fully below. The eight probabilities correspond to the eight possible transitions among the five possible data rates. So, the transitional probabilities correspond to transitioning (in kbps) (1) from 9.6 up to 19.2, (2) from 19.2 up to 38.4, (3) from 38.4 up to 76.8, (4) from 76.8 up to 153.6, (5) from 153.6 down to 76.8, (6) from 76.8 down to 38.4, (7) from 38.4 down to 19.2, and (8) from 19.2 down to 9.6.

Typically, when an access terminal is at the start of transmitting a given frame at a given data rate (say, 38.4 kbps), the access terminal checks the RAB. If the RAB is cleared (i.e. equal to 0), the RNR in the sector is not above the RNR threshold, and thus the access terminal knows that it has two options with respect to the next frame: stay at 38.4 kbps or move up to 76.8 kbps. To determine which of those options the access terminal will take for the next frame, the access terminal generates a random integer between 0 and 255, and compares that random integer with the appropriate transitional probability. In this example, the access terminal would compare the random integer with the 38.4-kbps-to-76.8-kbps value.

If the random integer is less than or equal to the 38.4-kbps-to-76.8-kbps table value, the access terminal will transition up to 76.8 kbps for the next frame. If not, the access terminal will stay at 38.4 kbps for the next frame. The table value is thus a representation of a probability, since the integer that the access terminal compares with the table value is randomly generated.

If, say, the table value were 255, the access terminal would have a probability of 1.00 (100%) for moving up to the next-higher data rate; if the table value were 0, the access terminal would only have a $\frac{1}{256}$ probability of moving up. And so on.

If the RAB is set (again, equal to 1), however, the access node has decided that there is too much reverse noise on the sector-carrier at the moment, and thus the access terminal knows that it has two options with respect to the next frame. Again using 38.4 kbps as an example of the access terminal's current rate, the two options are to stay at 38.4 kbps or move down to 19.2 kbps. To determine which of those options the access terminal will take for the next frame, the access terminal again generates a random integer between 0 and 255, and compares that random integer with the appropriate reverse-link transitional probability. This time, the access terminal would compare the random integer with the 38.4-kbps-to-19.2-kbps value.

As with transitions up to higher data rates, when talking about transitions down to lower data rates, the access terminal checks whether the random integer it generates is less than or equal to the 38.4-to-19.2 table value. If so, the access terminal will transition down to 19.2 kbps for the next frame. If not, the access terminal will stay at 38.4 kbps for the next frame. Again, the table value represents a probability, as the integer that the access terminal compares with the table value is randomly generated. If, the table value were 255, the access terminal would have a probability of 1.00 (100%) for moving down to the next-lower data rate; if the table value were 0, the access terminal would only have a $\frac{1}{256}$ probability of moving down. And so on.

5. Access Terminals Using the RAB Under IS-856, Rev. A

As explained above, under Rev. 0, reverse-link data rates are permitted only to increase or decrease by one step at a time (i.e. up to the next-higher data rate or down to the next-lower data rate), controlled by the RAB and the tables of reverse-link transitional probabilities. Under Rev. A, however, a more dynamic, iterative, equation-based approach is utilized, which permits data rates to change more rapidly.

Briefly, under Rev. A, the access node still repeatedly transmits a RAB equal to 0 or 1. Each individual access terminal then uses that value to compute what are known as a Quick Reverse Activity Bit (QRAB) and a Filtered Reverse Activity Bit (FRAB). The QRAB is binary (equal to 0 or 1), while the FRAB is a real number having a value anywhere between −1 and 1 inclusive. The QRAB is a short-term, binary indication of loading: a QRAB of 1 is associated with congestion on the sector-carrier, while a QRAB of 0 is associated with non-congestion. The FRAB is more of a long-term, continuous, historical value, where values closer to −1 indicate a lower degree of congestion on the sector-carrier reverse link, while values closer to 1 indicate a higher degree of congestion on the sector-carrier reverse link. Thus, both the QRAB and the FRAB reflect the access terminal's interpretation of the RAB from the access node.

The access terminal then calculates a value known in Rev. A as "T2PInflow." T2PInflow is an iterative value: prior to each reverse-link transmission, it has a current value, and that current value is one of the inputs in determining its value in the next calculation. Note that the "T2P" prefixes to many of the value and function names in this explanation means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector-carrier), then T2PInflow will be decremented by the result of T2PDn(.); if, on the other hand, the access terminal sets QRAB to 0 (corresponding to a relatively non-congested sector-carrier), then T2PInflow will be incremented by the result of T2PUp(.). As with all of the details of these computations, the detailed equations can be found in IS-856, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, higher reverse-link data rates are correlated with higher reverse-link transmission power levels. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate. Under IS-856, Rev. A, effective reverse-link data rates can range from 19.2 kbps up to 1.84 megabits per second (Mbps). As a final part of the calculation, the access terminal computes a value known as "T2POutflow" (a.k.a. "actual T2POutflow") based on the computed packet size. The access terminal then updates BucketLevel with the updated T2PInflow value and the newly-calculated (actual) T2POutflow value, so that BucketLevel will be ready for the next iteration.

OVERVIEW

As explained, EV-DO access terminals use the value of the RAB in different ways under IS-856, Rel. 0 and IS-856, Rev. A for determining their reverse-link data rates. However, under both standards, access nodes make repeated, periodic broadcasts of the RAB (equal to 0 or 1) on a given sector-carrier, and all of the access terminals on that sector-carrier, regardless of whether the access terminals are operating according to IS-856, Rel. 0 or IS-856 Rev. A, interpret the RAB by (a) maintaining or increasing their reverse-link data rates when the RAB is clear and (b) maintaining or decreasing their reverse-link data rates when the RAB is set.

Access terminals operating according to IS-856, Rel. 0 ("Rel. 0 access terminals") have a maximum reverse-link burst rate of 153.6 kbps. In other words, when Rel. 0 access terminals are transmitting reverse-link data, they can do so no faster than 153.6 kbps. Access terminals operating according to IS-856, Rev. A ("Rev. A access terminals"), however, have a maximum reverse-link burst rate of 1.8 Megabits per second (Mbps). The conventional use of the RAB for all access terminals, Rel. 0 and Rev. A alike, on a sector-carrier has at least one undesirable consequence: when a sector-carrier is serving a mix of Rel. 0 and Rev. A access terminals, the Rel. 0 access terminals contribute reverse noise, which may trigger the setting of the RAB, which will hold down the reverse-link data rates of the Rev. A access terminals. Thus, Rev. A access terminals are often not able to realize their full reverse-link potential, which negatively impacts the experience of users engaging in communications with Rev. A access terminals.

In accordance with the present methods and systems, an access node maintains a RAB threshold (a.k.a. RNR threshold). As described, the access node periodically measures RNR, and then compares its most recent measurement of RNR to the RAB threshold, and responsively sets or clears the RAB accordingly. The access node also periodically (which may be according to the same or a different period than that used for measuring RNR and responsively changing or maintaining the set or clear state of the RAB) computes a ratio (the "Rev. A ratio") of (a) Rev. A access terminals being served on the sector-carrier to (b) all access terminals being served on the sector carrier. This ratio could be expressed as a percentage, a decimal number, etc. Thus, if there were 10 Rel. 0 access terminals and 30 Rev. A access terminals on a given sector-carrier, the Rev. A ratio would be 0.75.

In addition to sending out the RAB on the forward link, the access node also sends out the computed Rev. A ratio. Rel. 0 access terminals then process the RAB and Rev. A ratio in the following manner: if the RAB is clear, the Rel. 0 access terminals process the RAB as they normally would, i.e. as described above. If the RAB is set, however, the Rel. 0 access terminals also evaluate the value of the Rev. A ratio against a ratio threshold. If the Rev. A ratio is less than the ratio threshold, the Rel. 0 access terminals process the RAB as they normally would, i.e. as described above. If the Rev. A ratio exceeds the ratio threshold, however, the Rel. 0 access terminals decrease their reverse-link data rates without reference to any reverse-link transitional probabilities. This could involve transitioning immediately to a lowest possible reverse-link data rate (e.g. 9.6 kbps), or it could involve transitioning one by one down the ladder of reverse-link data rates until reaching that lowest possible rate. And other variations are possible as well.

In another embodiment, the access node may compute and send out a Rel. 0 ratio, which may be computed as a ratio of (a) Rel. 0 access terminals being served on the sector-carrier to (b) all access terminals being served on the sector carrier. In this embodiment, the Rel. 0 access terminals would behave just as described in the preceding paragraph, other than that they would process the RAB as normal when (a) the RAB is clear and (b) the RAB is set and the Rel. 0 ratio exceeds a ratio threshold, and would decrease their reverse-link data rates without reference to any reverse-link transitional probabilities when the RAB is set and the Rel. 0 ratio is less than the ratio threshold. As before, the Rel. 0 ratio could be expressed as a percentage, decimal number, etc. Thus, if there were 10 Rel. 0 access terminals and 30 Rev. A access terminals on a given sector-carrier, the Rel. 0 ratio would be 0.25.

Thus, in times where a high number of Rev. A access terminals are receiving service on a sector-carrier relative to the number of Rel. 0 access terminals receiving service on the sector-carrier, Rel. 0 access terminals will rapidly ramp down their reverse-link data rates, and thus their reverse-link transmission power, which should create a more favorable RF environment in which the Rev. A access terminals have a better chance of reaching maximum possible reverse-link performance. And in times when there is a low number of Rev. A access terminals relative to the number of Rel. 0 access terminals, all access terminals will receive service and process the RAB as they normally would. And forward-link service will be improved as well, since packet acknowledgements sent by access terminals on the reverse link to the network will be more reliably received, which will reduce retransmissions and improve throughput on the forward link.

Note that an access node may identify a given access terminal as a Rel. 0 access terminal or Rev. A access terminal by an identifier known as a MAC ID that is assigned to each access terminal during session setup. In one embodiment, MAC IDs 2-63 may be assigned to Rev. A access terminals, while MAC IDs 64-127 may be assigned to Rel. 0 access terminals. And the access node may use a MAC sub-channel (e.g. 1) to transmit either the Rev. A ratio or the Rel. 0 ratio to Rel. 0 access terminals. And other arrangements are certainly possible, such as assigning different ranges of MAC IDs to Rel. 0 and Rev. A access terminals, using a different MAC sub-channel for transmitting the computed Rel. 0 ratio or Rev. A ratio, reserving additional and/or different MAC sub-channels for other administrative purposes, and/or many other possibilities.

And it is explicitly noted that, with respect any embodiment, the classification of a given access terminal as Rel. 0 or Rev. A may indicate that the access terminal is only capable of operating according to that release or revision. However, it may also indicate that the access terminal is capable of operating according to either Rel. 0 or Rev. A, but in fact operates according to one or the other all the time, for service-plan reasons or other reasons. Furthermore, it may indicate that the access terminal is capable of operating according to either Rel. 0 or Rev. A, and operates in both at various times, and is operating according to the noted release or revision at the time the classification is made. And still other possibilities exist, without detracting from the scope or spirit of the present methods and systems.

And it should be noted that the above overview is illustrative and not limiting. That is, additional and/or different features may be present in some embodiments of the present invention. It should be noted as well that any description of an access node and/or one or more access terminals communicating according to EV-DO is by way of example, and that any suitable modes (e.g. protocols) may be used instead, such as CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Exemplary Architecture

Figure 1:
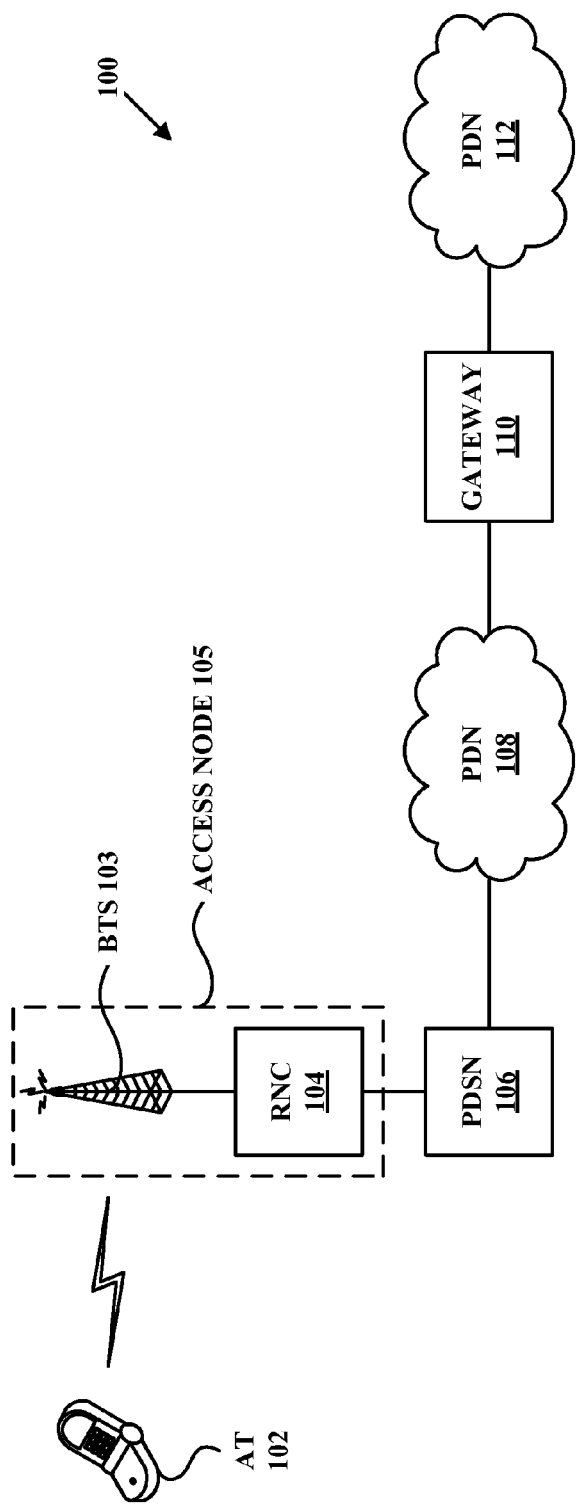
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, and a PDN 112. And additional entities not depicted could be present as well. For example, there could be more than one access terminal in communication with access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1×RTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

Note that access node 105 may comprise BTS 103 and RNC 104, and may comprise one or more additional BTSs as well. In general, access node 105 provides wireless service to access terminals over an air interface, and uses a backhaul connection to provide transport service over PDN 108 (or perhaps PDN 108 and PDN 112) to those access terminals.

PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

2. Exemplary Operation a. A First Exemplary Method

Figure 2:
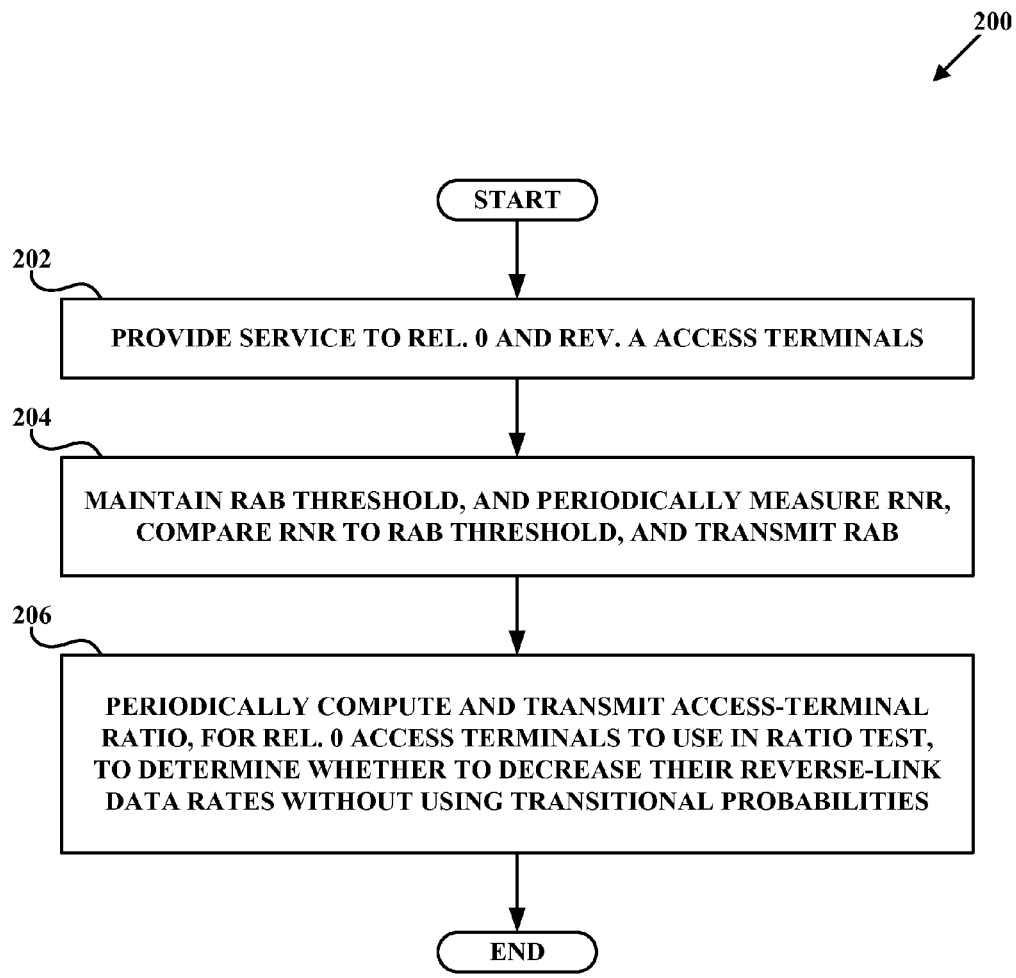
FIG. 2 depicts a method, in accordance with exemplary embodiments.

FIG. 2 depicts an exemplary method that may be carried out by an access node such as access node 105. And although method 200 is described herein as being carried out by access node 105, this is not required; in general, method 200 may be carried out by an access node, a BTS, an RNC, a PDSN, one or more other network entities, or some combination thereof.

At step 202, access node 105 provides wireless service to a plurality of access terminals on a carrier (e.g. a sector-carrier) in a coverage area (e.g. a sector). The plurality of access terminals consists of a first subset and a second subset, where the first and second subsets are mutually exclusive. The first subset operates according to IS-856, Rel. 0, and the second subset operates according to IS-856, Rev. A.

At step 204, access node 105 maintains a RAB threshold, and periodically measures RNR on the carrier, compares the measured RNR to the RAB threshold, and transmits a RAB to the plurality of access terminals. Note that the RAB is set when the measured RNR exceeds the RAB threshold, and clear when the measured RNR does not exceed the RAB threshold.

At step 206, access node 105 periodically (i) computes a ratio of (a) either (1) a number of access terminals in the first subset or (2) a number of access terminals in the second subset to (b) a total number of access terminals in the first and second subsets, and (ii) transmits the computed ratio to at least the access terminals in the first subset. When the RAB is set, the access terminals in the first subset (a) perform a ratio test by comparing the computed ratio with a ratio threshold and (b) decrease their reverse-link data rates without reference to any reverse-link transitional probabilities when the computed ratio passes the ratio test.

Note that access node 105 may use the same period or different periods for (a) measuring RNR and transmitting the RAB (in step 204) and (b) computing and transmitting the ratio (in step 206). Furthermore, if the ratio is computed using the number of access terminals in the first subset, then the ratio test is whether the computed ratio is less than the ratio threshold. If the ratio is computed using the number of access terminals in the second subset, however, then the ratio test is whether the computed ratio exceeds the ratio threshold. Furthermore, access node 105 may transmit the computed ratio in a MAC sub-channel.

In an embodiment, at least one access terminal in the first subset decreases its reverse-link data rate without reference to any reverse-link transitional probabilities by transitioning directly from a current reverse-link data rate to a minimum reverse-link data rate. In an embodiment, at least one access terminal in the first subset decreases its reverse-link data rate without reference to any reverse-link transitional probabilities by transitioning one by one through a sequence of decreasing data rates until reaching a minimum reverse-link data rate. In either case, the minimum data rate could be 9.6 kbps, though other values could be used.

In an embodiment, when the RAB is clear, the access terminals in the first subset maintain or increase their reverse-link data rates according to a set of reverse-link transitional probabilities, perhaps as described above with respect to Rel. 0 access terminals processing the RAB. In an embodiment, when (a) the RAB is set and (b) the computed ratio fails the ratio test, the access terminals in the first subset maintain or decrease their reverse-link data rates according to a set of reverse-link transitional probabilities, also perhaps as described above.

b. A Second Exemplary Method

Figure 3:
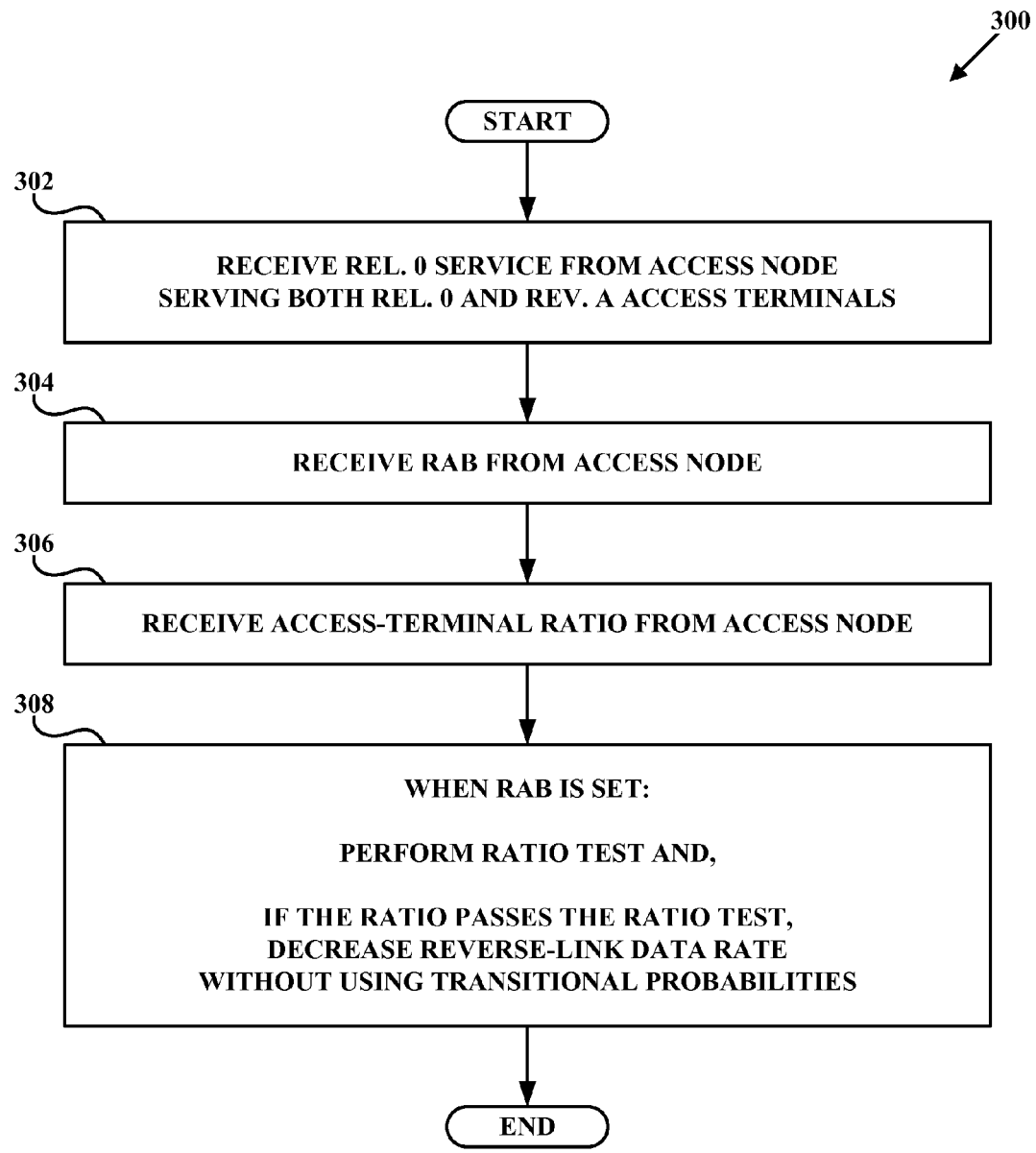
FIG. 3 depicts a method, in accordance with exemplary embodiments.

FIG. 3 depicts an exemplary method that may be carried out by an access terminal such as access terminal 102. And although method 200 is described herein as being carried out by access terminal 102, method 200 could instead be carried out by access terminal 102 in cooperation with one or more other network entities, such as an access node, a BTS, an RNC, a PDSN, one or more other network entities, or some combination thereof. And it should be noted that method 300 is similar in some ways to method 200, and thus is not described in as great of detail. It is expressly contemplated, however, that any possibility or permutation discussed in connection with one of method 200 and method 300 could apply just as well to the other.

Method 300 begins at step 302, where access terminal 102 receives wireless service from an access node, such as access node 105, on a carrier (e.g. a sector-carrier) in a coverage area (e.g. a sector). As was described above in connection with method 200, access node 105 is providing the service to a plurality of access terminals on the carrier in the coverage area, where the plurality of access terminals consists of a first subset and a second subset, the first and second subsets being mutually exclusive. The access terminals in the first subset operate according to IS-856, Rel. 0 and include the access terminal 102 (which therefore is a Rel. 0 access terminal), while the access terminals in the second subset operate according to IS-856, Rev. A.

At step 304, access terminal 102 receives a (set or clear) RAB from access node 105. At step 306, access terminal 102 receives from access node 105 a ratio of (a) either (1) a number of access terminals in the first subset or (2) a number of access terminals in the second subset to (b) a total number of access terminals in the first and second subsets.

At step 308, when the RAB is set, access terminal 102 (a) performs a ratio test by comparing the computed ratio with a ratio threshold and (b) decreases its reverse-link data rate without reference to any reverse-link transitional probabilities when the computed ratio passes the ratio test. If the ratio is computed using the number of access terminals in the first subset, then the ratio test is whether the computed ratio is less than the ratio threshold. If the ratio is computed using the number of access terminals in the second subset, however, then the ratio test is whether the computed ratio exceeds the ratio threshold.

In an embodiment, access terminal 102 decreasing its reverse-link data rate without reference to any reverse-link transitional probabilities involves access terminal 102 transitioning directly from its current reverse-link data rate to a minimum reverse-link data rate. In another embodiment, access terminal 102 decreasing its reverse-link data rate without reference to any reverse-link transitional probabilities involves access terminal 102 transitioning one by one through a sequence of decreasing data rates until reaching a minimum reverse-link data rate. The minimum data rate may be 9.6 kbps, or perhaps another value.

In an embodiment, when the RAB is clear, access terminal 102 maintains or increases its reverse-link data rate according to a set of reverse-link transitional probabilities, perhaps as described above with respect to Rel. 0 access terminals processing the RAB. In an embodiment, when (a) the RAB is set and (b) the computed ratio fails the ratio test, access terminal 102 maintains or decreases its reverse-link data rate according to a set of reverse-link transitional probabilities, also perhaps as described above.

3. Conclusion

Various exemplary embodiments have been described above. Those skilled in the art will understand, however, that changes and modifications may be made to those examples without departing from the scope of the claims.

The invention claimed is:

1. A method comprising:
an access node providing wireless service to a plurality of access terminals on a carrier in a coverage area, the plurality of access terminals consisting of a first subset and a second subset, the first and second subsets being mutually exclusive, the first subset operating according to IS-856, Release 0, and the second subset operating according to IS-856, Revision A;
the access node maintaining a reverse activity bit (RAB) threshold, and periodically measuring reverse noise rise (RNR) on the carrier, comparing the measured RNR to the RAB threshold, and transmitting a RAB to the plurality of access terminals, wherein the RAB is set when the measured RNR exceeds the RAB threshold, and wherein the RAB is clear when the measured RNR does not exceed the RAB threshold; and
the access node periodically:
computing a ratio of (a) either (1) a number of access terminals in the first subset or (2) a number of access terminals in the second subset to (b) a total number of access terminals in the first and second subsets, and
transmitting the computed ratio to at least the access terminals in the first subset, wherein, when the RAB is set, the access terminals in the first subset (a) perform a ratio test by comparing the computed ratio with a ratio threshold and (b) decrease their reverse-link data rates without reference to any reverse-link transitional probabilities when the computed ratio passes the ratio test.

2. The method of claim 1, wherein the access node comprises a radio network controller (RNC) and at least one base transceiver station (BTS).

3. The method of claim 1, wherein the coverage area is a sector, and wherein the carrier is a sector-carrier.

4. The method of claim 1, wherein the access node uses the same period for (a) measuring RNR and transmitting the RAB and (b) computing and transmitting the ratio.

5. The method of claim 1, wherein the access node uses different periods for (a) measuring RNR and transmitting the RAB and (b) computing and transmitting the ratio.

6. The method of claim 1, wherein the ratio is computed using the number of access terminals in the first subset, and wherein the ratio test is whether the computed ratio is less than the ratio threshold.

7. The method of claim 1, wherein the ratio is computed using the number of access terminals in the second subset, and wherein the ratio test is whether the computed ratio exceeds the ratio threshold.

8. The method of claim 1, wherein transmitting the computed ratio comprises transmitting the computed ratio in a MAC sub-channel.

9. The method of claim 1, wherein the access terminals in the first subset decreasing their reverse-link data rates without reference to any reverse-link transitional probabilities comprises at least one access terminal in the first subset transitioning directly from a current reverse-link data rate to a minimum reverse-link data rate.

10. The method of claim 9, wherein the minimum reverse-link data rate is 9.6 kilobits per second (kbps).

11. The method of claim 1, wherein the access terminals in the first subset decreasing their reverse-link data rates without reference to any reverse-link transitional probabilities comprises at least one access terminal in the first subset transitioning one by one through a sequence of decreasing data rates until reaching a minimum reverse-link data rate.

12. The method of claim 11, wherein the minimum reverse-link data rate is 9.6 kilobits per second (kbps).

13. The method of claim 1, wherein, when the RAB is clear, the access terminals in the first subset maintain or increase their reverse-link data rates according to a set of reverse-link transitional probabilities.

14. The method of claim 1, wherein, when (a) the RAB is set and (b) the computed ratio fails the ratio test, the access terminals in the first subset maintain or decrease their reverse-link data rates according to a set of reverse-link transitional probabilities.

15. An access node comprising:
a communication interface comprising a wireless-communication interface;
a processor; and
data storage comprising instructions executable by the processor for causing the access node to carry out functions including:
providing wireless service to a plurality of access terminals on a carrier in a coverage area, the plurality of access terminals consisting of a first subset and a second subset, the first and second subsets being mutually exclusive, the first subset operating according to IS-856, Release 0, and the second subset operating according to IS-856, Revision A;
maintaining a reverse activity bit (RAB) threshold, and periodically measuring reverse noise rise (RNR) on the carrier, comparing the measured RNR to the RAB threshold, and transmitting a RAB to the plurality of access terminals, wherein the RAB is set when the measured RNR exceeds the RAB threshold, and wherein the RAB is clear when the measured RNR does not exceed the RAB threshold; and
periodically:
computing a ratio of (a) either (1) a number of access terminals in the first subset or (2) a number of access terminals in the second subset to (b) a total number of access terminals in the first and second subsets, and
transmitting the computed ratio to at least the access terminals in the first subset, wherein, when the RAB is set, the access terminals in the first subset (a) perform a ratio test by comparing the computed ratio with a ratio threshold and (b) decrease their reverse-link data rates without reference to any reverse-link transitional probabilities when the computed ratio passes the ratio test.

16. The access node of claim 15, wherein the access node comprises a radio network controller (RNC) and at least one base transceiver station (BTS).

17. The access node of claim 15, wherein the ratio is computed using the number of access terminals in the first subset, and wherein the ratio test is whether the computed ratio is less than the ratio threshold.

18. The access node of claim 15, wherein the ratio is computed using the number of access terminals in the second subset, and wherein the ratio test is whether the computed ratio exceeds the ratio threshold.

19. A method comprising:
a given access terminal receiving wireless service from an access node on a carrier in a coverage area, wherein the access node is providing the service to a plurality of access terminals on the carrier in the coverage area, the plurality of access terminals consisting of a first subset and a second subset, the first and second subsets being mutually exclusive, the first subset operating according to IS-856, Release 0 and including the given access terminal, and the second subset operating according to IS-856, Revision A;
the given access terminal receiving a reverse activity bit (RAB) from the access node, wherein the RAB has a set state and a clear state;
the given access terminal receiving from the access node a ratio of (a) either (1) a number of access terminals in the first subset or (2) a number of access terminals in the second subset to (b) a total number of access terminals in the first and second subsets, and
when the received RAB is in the set state, the given access terminal (a) performing a ratio test by comparing the computed ratio with a ratio threshold and (b) decreasing its reverse-link data rate without reference to any reverse-link transitional probabilities when the computed ratio passes the ratio test.

20. The method of claim 19, wherein the ratio is computed using the number of access terminals in the first subset, and wherein the ratio test is whether the computed ratio is less than the ratio threshold.

21. The method of claim 19, wherein the ratio is computed using the number of access terminals in the second subset, and wherein the ratio test is whether the computed ratio exceeds the ratio threshold.

22. The method of claim 19, wherein the given access terminal decreasing its reverse-link data rate without reference to any reverse-link transitional probabilities comprises the given access terminal transitioning directly from a current reverse-link data rate to a minimum reverse-link data rate.

23. The method of claim 19, wherein the given access terminal decreasing its reverse-link data rate without reference to any reverse-link transitional probabilities comprises the given access terminal transitioning one by one through a sequence of decreasing data rates until reaching a minimum reverse-link data rate.

24. The method of claim 19, further comprising, when the RAB is in the clear state, the given access terminal maintaining or increasing its reverse-link data rate according to a set of reverse-link transitional probabilities.

25. The method of claim 19, further comprising, when (a) the RAB is set and (b) the computed ratio fails the ratio test, the given access terminal maintaining or decreasing its reverse-link data rate according to a set of reverse-link transitional probabilities.

* * * * *